(12) United States Patent
Piccolo

(10) Patent No.: US 8,291,599 B2
(45) Date of Patent: Oct. 23, 2012

(54) UNIVERSAL MOWING HEAD FOR FLEXIBLE CUTTER

(76) Inventor: Michele Piccolo, Turin (IT)

(*) Notice: Subject to any disclaimer, the term of this patent is extended or adjusted under 35 U.S.C. 154(b) by 343 days.

(21) Appl. No.: 12/594,968

(22) PCT Filed: Apr. 10, 2007

(86) PCT No.: PCT/IT2007/000266
§ 371 (c)(1),
(2), (4) Date: Oct. 7, 2009

(87) PCT Pub. No.: WO2008/123001
PCT Pub. Date: Oct. 16, 2008

(65) Prior Publication Data
US 2010/0115909 A1    May 13, 2010

(51) Int. Cl.
*A01D 34/416* (2006.01)
(52) U.S. Cl. .................................. 30/276; 30/347
(58) Field of Classification Search ............ 30/276, 30/347; 56/12.7, 295
See application file for complete search history.

(56) References Cited

U.S. PATENT DOCUMENTS

| | | | | |
|---|---|---|---|---|
| 4,043,037 A * | 8/1977 | Okamoto et al. | | 30/276 |
| 4,607,431 A * | 8/1986 | Gay | | 30/276 |
| 4,631,828 A * | 12/1986 | Burnett | | 30/276 |
| 6,298,642 B1 * | 10/2001 | Harb | | 56/12.7 |
| 6,363,616 B1 * | 4/2002 | Kreissle | | 30/347 |
| 6,519,857 B1 * | 2/2003 | Proulx et al. | | 30/276 |
| 6,705,016 B2 * | 3/2004 | Nystrom et al. | | 30/347 |
| 7,395,601 B2 * | 7/2008 | Berfield | | 30/276 |
| 8,061,042 B2 * | 11/2011 | Arnetoli | | 30/276 |
| 2004/0237315 A1 * | 12/2004 | Alliss | | 30/276 |
| 2005/0126017 A1 * | 6/2005 | Fogle | | 30/347 |
| 2006/0026846 A1 * | 2/2006 | Alliss | | 30/276 |
| 2008/0155955 A1 * | 7/2008 | Walker | | 56/12.7 |

FOREIGN PATENT DOCUMENTS

| | | |
|---|---|---|
| EP | 1183932 A | 3/2002 |
| WO | 2006/016817 A | 2/2006 |
| WO | WO 2006/016817 * | 2/2006 |

OTHER PUBLICATIONS

International Search Report dated Dec. 7, 2007 in corresponding international patent application No. PCT/IT2007/000266, 3 pages.

* cited by examiner

*Primary Examiner* — Hwei C Payer
(74) *Attorney, Agent, or Firm* — Maier & Maier PLLC

(57) ABSTRACT

A mowing head is described, particularly for a bush-cutter, comprising a rotor rotating around a rotation axis (R-R) and its cover, in which the rotor is equipped with at least one supporting surface from which at least one external perimeter wall and at least one internal wall depart, such external perimeter wall and such internal wall mutually defining at least one housing seat of at least one length of flexible cutter, the external perimeter wall being radially equipped with at least one slit adapted to allow at least one length of the flexible cutter to go out from inside the housing seat to the outside.

17 Claims, 3 Drawing Sheets

UNIVERSAL MOWING HEAD FOR FLEXIBLE CUTTER

RELATED APPLICATIONS

The present invention is a national stage application which claims priority to international patent Application No. PCT/IT2007/000266, filed on Apr. 10, 2007, the disclosure of which is incorporated by reference herein in its entirety.

BACKGROUND OF THE INVENTION

1. Field of the Invention

The present invention refers to a universal mowing head for flexible cutter, aimed in particular to be used as cutting head for bush-cutters.

2. Background Art

As known, the bush-cutter is a tool used for cutting bushes, shrubs and grass in places not accessible with other machines. It is carried on straps or on the shoulders by an operator and is equipped with an engine of the electric or combustion type that, through a transmission shaft placed inside a rod, actuates, by rotating it, a rigid toothed disk or a mowing head that usually supports from two to four flexible cutters, made as nylon wires, thin metal cables or chains.

In the particular case of mowing heads, flexible cutters made as nylon wires are usually wound around a spring-loaded coil contained inside the head itself, from which they can be unwound and delivered outside, either manually by the operator for the length that is deemed appropriate for performing the work, or automatically by exploiting the centrifugal force that is generated upon rotating the mowing head during its use.

Such heads however are often technically and mechanically very complex and therefore, in addition to being relatively costly, they have a common disadvantage pertaining to their reliability: such heads, in fact, suffer the inconvenience that they get often jammed when the operator tries to remove new wires from the coil, for example if the one already inside it is damaged or broken. When this occurs, the operator must stop his moving work, disassemble the mowing head, unlock the coil and re-assemble the head in order to be able to restart working. Moreover, not rarely such inconvenience occurs rather frequently during the mowing work. It is clear therefore that these continuous interruptions bring about unpleasant losses of time, in addition to an unavoidable frustration for the operator.

In simpler and more inexpensive versions of the mowing heads, above all when the cutter is of the chain type, flexible cutters are simply fastened on their external surface, for example through screws or bolts. Also in this case, the replacement of a broken or damaged cutter requires a not neglectable time and often the use of tools, at the same time resulting as extremely frustrating for the operator.

Moreover, in case of work which requires the following use of different types of cutters, the operator must have available different heads for each type of cutter, and must stop in order to replace them at suitable times. In fact, the art does not provide for a mowing head that can, depending on specific working needs, allow an operator to indifferently use any type of flexible cutter, both made as a nylon wire, metallic or textile cable, chain or other, always with the same mowing head, after a simple and quick intervention activity on the head in order to install thereon the desired cutter. Also in this case, the mowing activity, in addition to be obviously expensive since it necessarily provides for the purchase and use of different heads, performed as such for every type of cutter, often requires long stops in order to proceed with their replacement.

SUMMARY OF THE INVENTION

Therefore, object of the present invention is solving the above prior art problems by providing a universal mowing head for flexible cutter, in particular for bush-cutter, that allows using it with any type of flexible cutter, both made, for example, as plastic single filament, nylon wire, metallic or textile cable, chain or other.

Moreover, an object of the present invention is providing a universal mowing head that allows easily and quickly replacing or delivering the flexible cutter contained therein.

Another object of the present invention is providing a bush-cutter equipped with a mowing head according to the present invention.

The above and other objects and advantages of the invention, as will appear from the following description, are obtained with a universal mowing head for flexible cutter as claimed in claim 1. Preferred embodiments and non-trivial variations of the present invention are the subject matter of the dependent claims.

BRIEF DESCRIPTION OF THE DRAWINGS

The present invention will be better described by some preferred embodiments thereof, provided as a non-limiting example, with reference to the enclosed drawings, in which:

FIG. 2a shows a sectional view of the element of FIG. 2 along the section line A-A;

FIG. 2b shows a sectional view of the element of FIG. 2 along the section line B-B;

DETAILED DESCRIPTION

Figure 1:
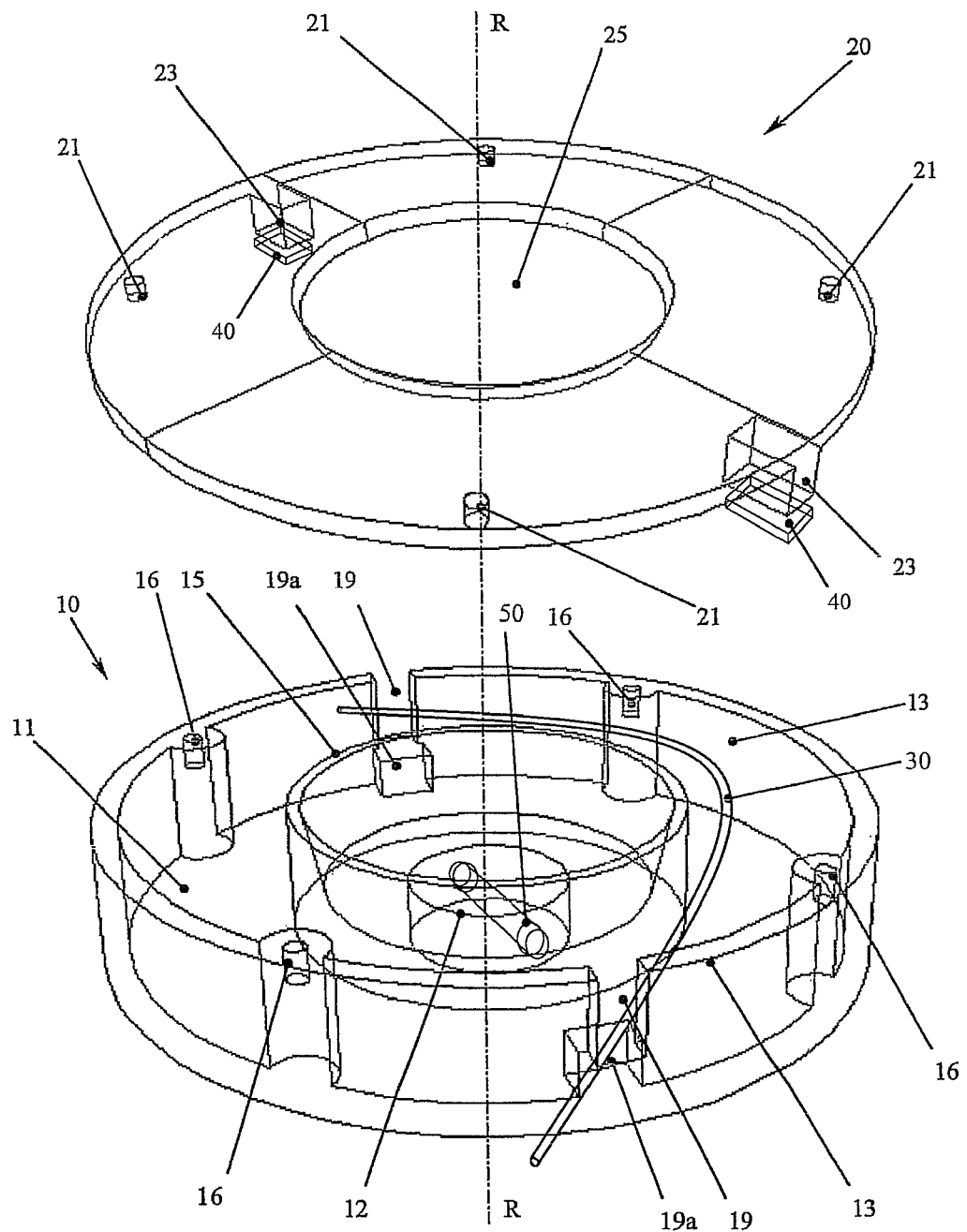
FIG. 1 shows a side perspective view of a preferred embodiment of the universal mowing head for flexible cutter according to the present invention in a partially disassembled configuration thereof.
Figure 2:
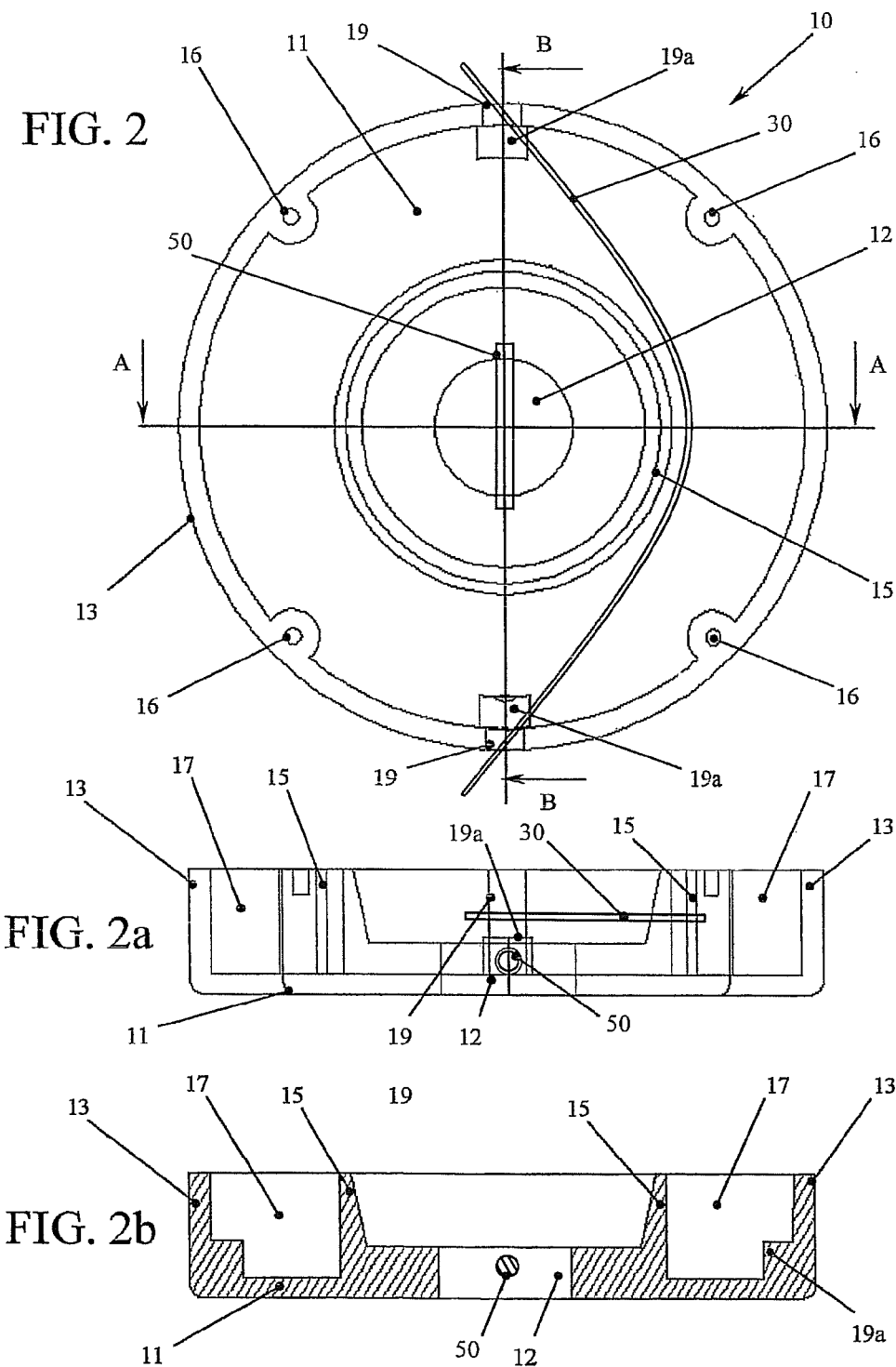
FIG. 2 shows a plan view of an element of the universal mowing head for flexible cutter of FIG. 1.
Figure 3:
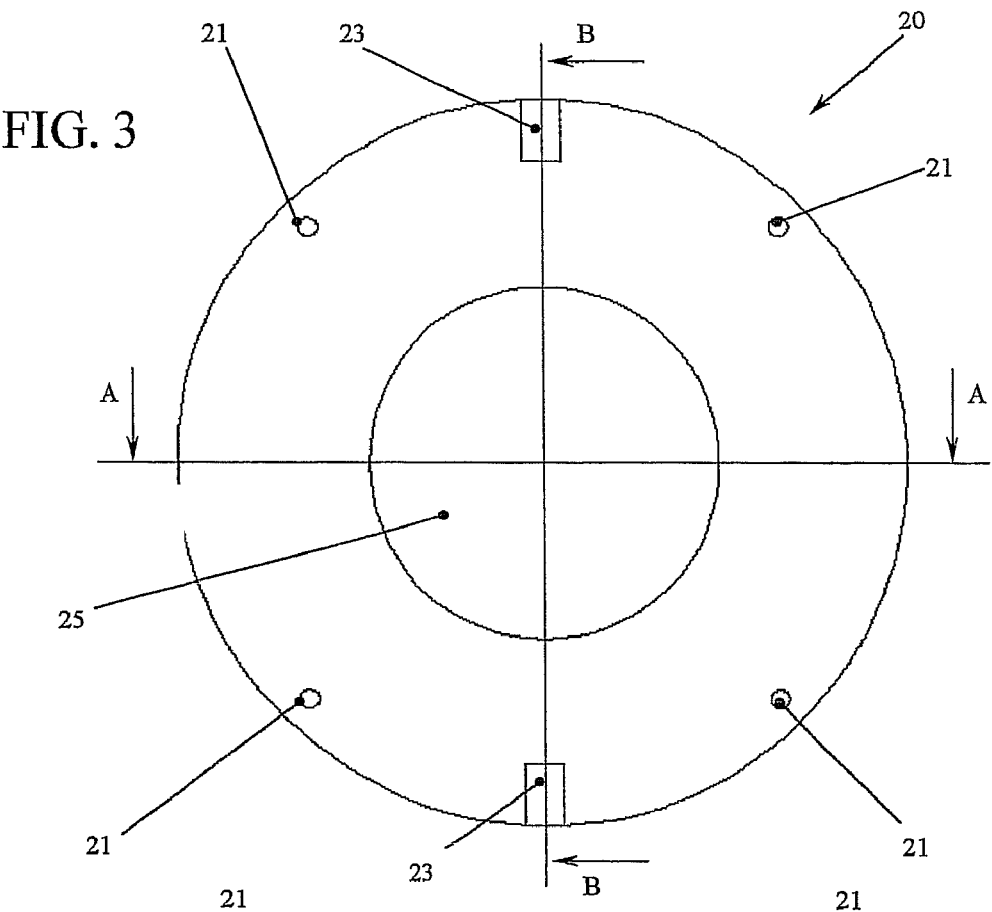
FIG. 3 shows a plan view of an element of the universal mowing head for flexible cutter of FIG. 1.
Figure 3A:
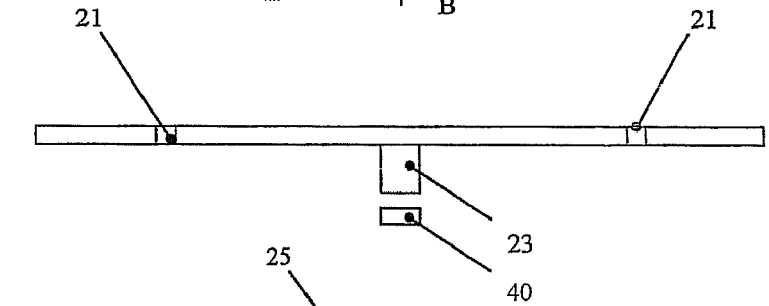
FIG. 3a shows a sectional view of the element of FIG. 3 along the section line A-A.
Figure 3B:
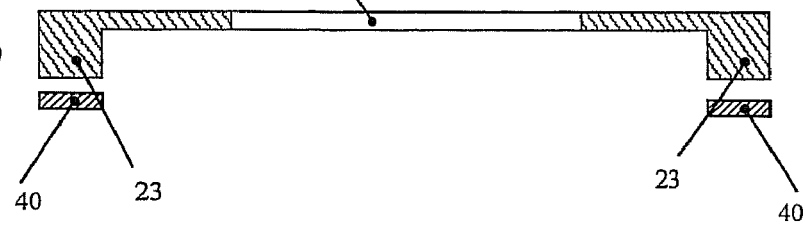
FIG. 3b shows a sectional view of the element of FIG. 3 along the section line B-B.

With reference therefore to the Figures, it is possible to note that the mowing head according to the present invention comprises a rotor 10 and its cover 20. The rotor 10 is made as a vessel adapted to contain therein a flexible cutter 30. The rotor 10, having a preferably circular plan shape due to obvious balancing reasons during its rotation around a rotation axis R-R, is equipped with at least one supporting surface 11, preferably circular with its centre along the rotation axis R-R, from which at least one external perimeter wall 13, preferably circular with its centre along the rotation axis R-R, and at least one internal wall 15, also preferably circular with its centre along the rotation axis R-R and therefore concentric with the external perimeter wall 13, but whose diameter is less than this latter one, depart, preferably in a substantially orthogonal direction thereto. The external perimeter wall 13 and the internal wall 15 mutually define, obviously in cooperation with the supporting surface 11, at least one space adapted to operate as housing seat 17 of the flexible cutter, that in the preferred embodiment of the mowing head according to the present invention assumes the shape of a circular crown with its centre along the rotation axis R-R.

Radially, the external perimeter wall 13 is further equipped with at least one slit 19 that communicates the interior of the housing seat with the exterior (for example, the embodiment of the mowing head according to the present invention, shown as an example in the Figures, is equipped with two slits 19 arranged diametrally opposite one to the other) adapted to allow at least one length of the flexible cutter to go out from inside the housing seat 17 to the outside. The slit 19 is preferably equipped with at least one supporting base 19a of the length of flexible cutter that crosses the slit 19 itself. The rotor 10 is further equipped with suitable fastening means to the drive shaft of a bush-cutter; in particular, such fastening means can preferably comprise at least one through hole 12 centrally arranged to the supporting surface 11 with its centre along the rotation axis R-R, and therefore concentric to the external perimeter wall 13 and the internal wall 15, whose diameter is less that the diameter of this latter one, through which the drive shaft of a bush-cutter has to be inserted, in order to then make it integral thereto through a suitable fastening system 50, such as for example at least one bolt, one peg or another suitable securing system.

The cover 20 is adapted to cover the rotor 10, and in particular at least the housing seat 17. For such purpose, the cover 20 is preferably made as at least one circular surface, whose diameter is substantially equal to the rotor 10 diameter, on which it can be suitably fastened, for example through a dap or through fastening means such as screws or bolts, crossing through-holes 21 suitably arranged thereon and divided in order to correspond to suitable threaded seats 16 arranged on the external perimeter wall 13 and/or on the internal wall 15 of the rotor 10. The cover 20 is further equipped on a lower face thereof, for example radially and perimetrally, with at least one blocking tooth 23 adapted to correspond to the slit 19 and to be inserted inside a part of this latter one when the cover 20 is covering the rotor 10. The blocking tooth 23 is adapted to block, through pressure against the supporting surface 11, the length of flexible cutter going out of the housing seat 11 in order to allow rotating the rotor 10 without its cutter completely going out of it. Preferably, the blocking tooth 23 cooperates with the supporting base 19a in order to press the flexible cutter against this latter one and still more efficiently block the flexible cutter inside the slit 19. Depending on the thickness of the type of flexible cutter that is desired, it is possible to further provide for the use of one or more thickening tongues 40 adapted to increase or decrease the space included between the blocking tooth 23 and the supporting surface 11 or the supporting base 19a.

Preferably, the cover 10 is further equipped with at least one central opening 25, whose shape is preferably circular with its centre along the rotation axis R-R, corresponding to the through hole 12 of the rotor 10 when the cover itself is covering it. In particular, the central opening 25 allows an operator, manually or through a suitable tool, to access the fastening system of the mowing head according to the present invention by the drive shaft of the bush-cutter. In such a way, the mowing head can be assembled/disassembled from the bush-cutter without the need of removing the cover 20 from the rotor 10, thereby resulting in a simpler, quicker and more practical use thereof. As described, the mowing head according to the present invention can advantageously be assembled on any bush-cutter as replacement for its original mowing head.

The use of the mowing head according to the present invention is thereby extremely practical: once the rotor 10 has been fastened to the drive shaft of a bush-cutter and the cover 20 has been removed from the rotor 10 itself, it is enough to insert at least one length of flexible cutter that is more preferred (in a plastic single wire, chain, nylon wire, metallic or textile cable, etc.) inside the housing seat 17 and make a length thereof with suitable or desired width pass through at least one of the slits 19 (the length that goes out typically depends on the engine power of the bush-cutter on which the mowing head is installed: through the slit 19, such length can therefore be, due to the mowing head according to the present invention, quickly and easily adjusted in its length). If the length of flexible cutter remained inside the housing seat is excessively long, this can advantageously be wound around the external surface of the internal wall 15, that for such purpose therefore operates as winding drum.

Now, it is enough to secure the cover 20 to the rotor 10 by inserting the blocking teeth 23 inside the slits 19 in order to block, possibly by interposing one or more thickening tongues, the flexible cutter inside it.

A similar operation is performed, obviously after having removed the cover 20 from the rotor 10 and the previously-used cutter, if it is desired, for example due to a different nature of the work to be performed, to replace the cutter with another one that is the same or with a different type (for example, replace a nylon wire with a chain).

If, when working, it is necessary to withdraw a new length of cutter from inside the housing seat 17, for example due to the fact that the length remained outside has broken or is excessively worn, it is thereby enough to slightly loosen the cover 20 from the rotor 10 to decrease the pressure of the blocking teeth 23, for example by loosening the securing screws, to withdraw the desired length of cutter, and to fasten again the cover 20 onto the rotor 10.

The present invention further includes a bush-cutter, made in a substantially known way, equipped with at least one mowing head according to the present invention.

The invention claimed is:

1. A mowing head for a bush-cutter, comprising:
a rotor rotating around a rotation axis and its cover, the rotor being equipped with at least one supporting surface from which at least one external perimeter wall and at least one internal wall depart, the external perimeter wall and the internal wall mutually defining at least one housing seat for housing at least one length of a flexible cutter, the external perimeter wall being radially equipped with at least one slit that communicates the housing seat with outside, adapted to allow at least one part of the flexible cutter to go out from inside the housing seat towards outside the housing seat, wherein the cover is equipped with at least one blocking tooth adapted to correspond to the slit and to be inserted inside a part of the slit, the slit being equipped with at least one supporting base for supporting at least a portion of the flexible cutter, the blocking tooth cooperating, through pressure, with the supporting surface and the supporting base in order to block the flexible cutter inside the slit; and
at least one thickening tongue adapted to increase or decrease a space included between the blocking tooth and the supporting surface or the supporting base.

2. The mowing head of claim 1, wherein the rotor has a circular plan shape with its centre along the rotation axis.

3. The mowing head of claim 1, wherein the supporting surface has a circular shape with its centre along the rotation axis.

4. The mowing head of claim 1, wherein the external perimeter wall is circular with its centre along the rotation axis.

5. The mowing head of claim 1, wherein the internal wall is circular with its centre along the rotation axis and whose diameter is less than a diameter of the external perimeter wall.

6. The mowing head of claim 1, wherein the housing seat is shaped as a circular crown with its centre along the rotation axis.

7. The mowing head of claim 1, wherein the rotor is equipped with fastening means from for a drive shaft of the bush-cutter.

8. The mowing head of claim 7, wherein the fastening means comprise at least one through hole through which the drive shaft of the bush-cutter must be inserted in order to make it integral therewith through a fastening system.

9. The mowing head of claim 8, wherein the through hole is arranged centrally to the supporting surface with its centre along the rotation axis and concentric with the external perimeter wall and with the internal wall, whose diameter is less than a diameter of the internal wall.

10. The mowing head of claim 9, wherein the fastening system is at least one bolt or one peg.

11. The mowing head of claim 8, wherein the cover is equipped with least one central opening corresponding to the through hole of the rotor.

12. The mowing head of claim 11, wherein the central opening has a circular shape with its centre along the rotation axis.

13. The mowing head of claim 1, wherein the cover is a circular surface whose diameter is equal to a diameter of the rotor.

14. The mowing head of claim 1, wherein the cover is secured onto the rotor through restraining.

15. The mowing head of claim 1, wherein the blocking tooth is radially and perimetrally arranged on a lower face of the cover.

16. The mowing head of claim 1, wherein the flexible cutter is a single plastic wire or a chain or a nylon wire or a metallic cable or a textile cable.

17. A bush-cutter equipped with at least one mowing head of claim 1.

* * * * *